(12) United States Patent
Wu

(10) Patent No.: US 9,405,715 B2
(45) Date of Patent: Aug. 2, 2016

(54) HOST COMPUTER AND METHOD FOR MANAGING SAS EXPANDERS OF SAS EXPANDER STORAGE SYSTEM

(71) Applicant: Zijilai Innovative Services Co., Ltd., Shenzhen (TW)

(72) Inventor: Chih-Huang Wu, New Taipei (TW)

(73) Assignee: Zijilai Innovative Services Co., Ltd., Shenzhen (CH)

( * ) Notice: Subject to any disclaimer, the term of this patent is extended or adjusted under 35 U.S.C. 154(b) by 456 days.

(21) Appl. No.: 14/040,770

(22) Filed: Sep. 30, 2013

(65) Prior Publication Data
US 2014/0164822 A1    Jun. 12, 2014

(30) Foreign Application Priority Data

Dec. 6, 2012    (TW) .............................. 101145783 A

(51) Int. Cl.
*G06F 11/00*    (2006.01)
*G06F 13/38*    (2006.01)
*G06F 11/20*    (2006.01)
*G06F 11/10*    (2006.01)
*G06F 11/14*    (2006.01)

(52) U.S. Cl.
CPC .......... *G06F 13/385* (2013.01); *G06F 11/2005* (2013.01); *G06F 11/1076* (2013.01); *G06F 11/14* (2013.01)

(58) Field of Classification Search
CPC ........................ G06F 11/1076; G06F 11/2005
See application file for complete search history.

(56) References Cited

U.S. PATENT DOCUMENTS

2011/0113172 A1* 5/2011 Shieh .................... G06F 13/364
710/113
2012/0278688 A1* 11/2012 Tsukamoto ............. G06F 11/10
714/799

* cited by examiner

*Primary Examiner* — Bryce Bonzo
*Assistant Examiner* — India Davis
(74) *Attorney, Agent, or Firm* — ScienBiziP, P.C.

(57) ABSTRACT

In a method for managing serial attached small computer system interface (SAS) expanders using a host computer, the host computer connects to an SAS expander storage system through a redundant array of independent disks (RAID) card. The SAS expander storage system includes a first switch device, a first SAS expander, a second SAS expander, a second switch, a flash memory, and hard disk drives. The method controls the first switch device to switch the RAID card from the first SAS expander to the second SAS expander when the first SAS expander fails to function, controls the second switch device to switch the flash memory from the first SAS expander to the second SAS expander, and controls the first switch device to connect each of the hard disk drives to the second SAS expander.

18 Claims, 3 Drawing Sheets

HOST COMPUTER AND METHOD FOR MANAGING SAS EXPANDERS OF SAS EXPANDER STORAGE SYSTEM

BACKGROUND

1. Technical Field

Embodiments of the present disclosure relate to Serial Attached Small Computer System Interface (SAS) expanders, and particularly to a host computer, a system, and a method for managing SAS expanders of an SAS expander storage system.

2. Description of Related Art

SAS expanders can be generally described as a switch device that allows initiator devices and target devices to communicate with each other, and allows additional initiator devices and target devices to be added to an SAS expander storage system. The target device such as a hard disk drive (HDD) may be attached to one or more SAS expanders of the SAS expander storage system, and transfer data from the HDD to an initiator device such as an external storage device. However, if one of the SAS expanders fails to function when the HDD accesses the storage device, data error may occur in the HDD and the storage device.

What is needed, therefore, is an SAS expander managing system and method to overcome the limitation described.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable media or storage medium. Some non-limiting examples of a non-transitory computer-readable medium include CDs, DVDs, flash memory, and hard disk drives.

Figure 1:
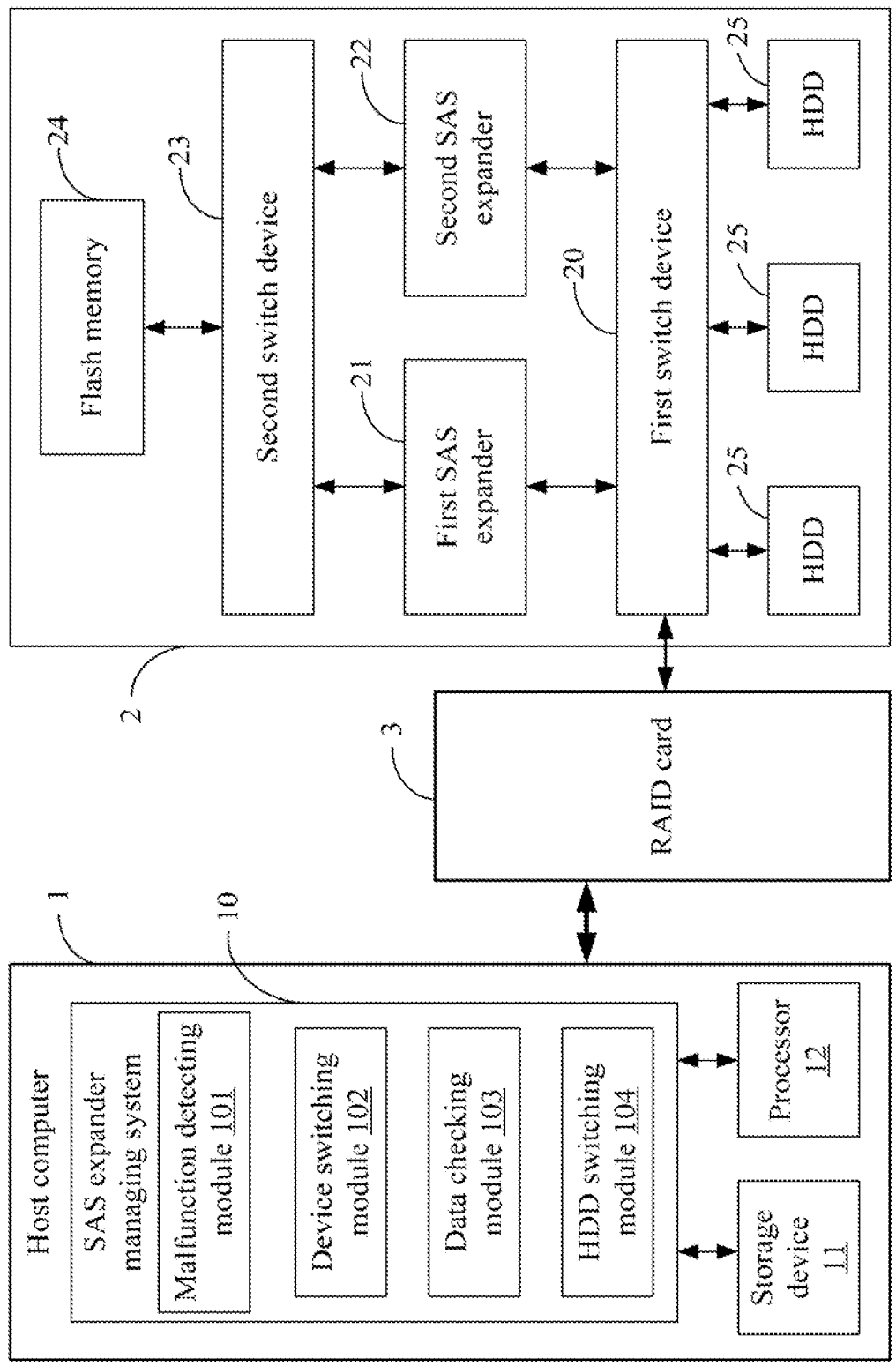
FIG. 1 is a block diagram of one embodiment of a host computer including an SAS expander managing system.

FIG. 1 is a block diagram of one embodiment of a host computer 1 including a serial attached small computer system interface (SAS) expander managing system 10. In the embodiment, the SAS expander managing system 10 is implemented by the host computer 1, and the host computer 1 connects to an SAS expander storage system 2 through a redundant array of independent disks (RAID) card 3. The host computer 1 further includes, but is not limited to, a storage device 11 and at least one processor 12. In one embodiment, the host computer 1 may be a personal computer, a server computer, a workstation computer, or other data computing device.

The SAS expander storage system 2 may be embedded or fixed in a printed circuit board (PCB), and may include a first switch device 20, a first SAS expander 21, a second SAS expander 22, a second switch device 23, a flash memory 24, and a plurality of hard disk drives (HDD) 25. The first switch device 20 connects to the RAID card 3, and connects to either the first SAS expander 21 or the second SAS expander 22. Each of the hard disk drives 25 is also connected to the first switch device 20, and can communicate with either the first SAS expander 21 or the second SAS expander 22 through the first switch device 20. The second switch device 23 connects to either the first SAS expander 21 or the second SAS expander 22, and is also connected to the flash memory 24.

The first switch device 20 is an electronic switch that switches the RAID card 3 to either the first SAS expander 21 or the second SAS expander 22, and switches each of the hard disk drives 25 to either the first SAS expander 21 or the second SAS expander 22. The second switch device 23 is a field programmable gate array (FPGA) device that switches the flash memory 24 to either the first SAS expander 21 or the second SAS expander 22.

The flash memory 24 includes a plurality of data storage areas, and a plurality of data backup areas. Each of the data storage areas stores basic data of the SAS expander storage system 2, and each of the data backup areas stores backup data of the basic data of the SAS expander storage system 2. In one embodiment, the basic data is used to support the communication between the RAID card 3 and either the first SAS expander 21 or the second SAS expander 22. The backup data is used to recover the basic data of the data areas when the basic data is destroyed, so as to assure that data error does not occur in the SAS expander storage system 2.

Figure 3:
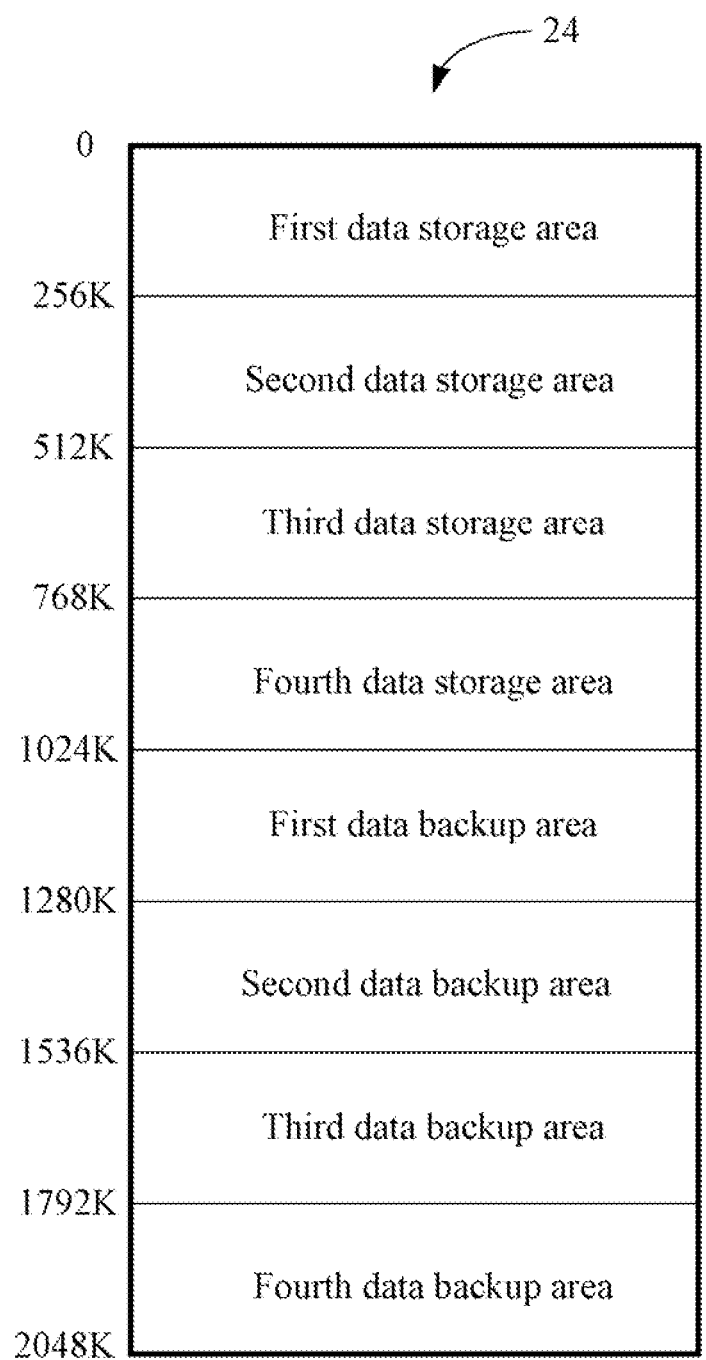
FIG. 3 shows one embodiment of data storage areas and data backup areas included in a flash memory of the SAS expander storage system.

In one example with respect to FIG. 3, the flash memory 24 includes a first data storage area for storing boot data of the SAS expander storage system 2, a second data storage area for storing active data of the SAS expander storage system 2, a third data area for storing configuration information of the SAS expander storage system 2, and the fourth data storage area for storing MFG data of the SAS expander storage system 2. The flash memory 24 further includes a first data backup area, a second data backup area, a third data backup area, and a fourth data backup area. Each of the data backup areas stores backup data corresponding to the basic data of each of the data storage areas.

The RAID card 3 is a redundant array of independent disks that include a plurality of storage disks. In the embodiment, the RAID card 3 communicates with each of the hard disk drives 25 through the first switch device 20, and each of the hard disk drives 25 communicates with either the first SAS expander 21 or the second SAS expander 22 through the first switch device 2.

In one embodiment, the storage device 11 may be an internal storage system, such as a random access memory (RAM) for temporary storage of information, and/or a read only memory (ROM) for permanent storage of information. The storage device 11 may also be an external storage system, such as an external hard disk, a storage card, or a data storage medium. The at least one processor 12 is a central processing unit (CPU) or microprocessor that performs various functions of the host computer 1.

In the embodiment, the SAS expander managing system 10 includes a malfunction detecting module 101, a device switching module 102, a data checking module 103, and a HDD switching module 104. The modules 101-104 may comprise computerized instructions in the form of one or more computer-readable programs that are stored in a non-transitory computer-readable medium (such as the storage device 11) and executed by the at least one processor 12. A description of each module is given in the following paragraphs.

Figure 2:
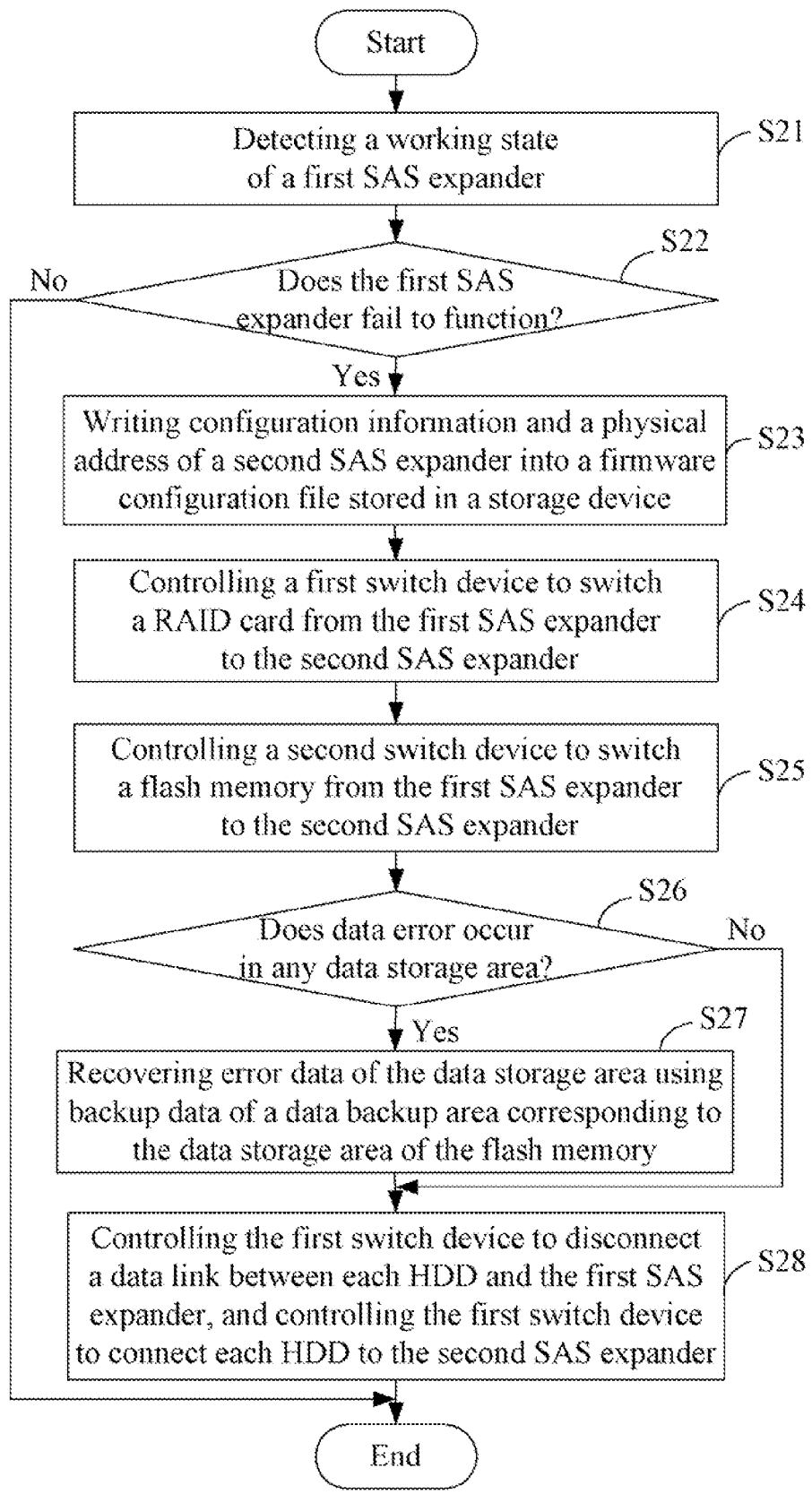
FIG. 2 is a flowchart of one embodiment of a method for managing SAS expanders of an SAS expander storage system using the host computer.

FIG. 2 is a flowchart of one embodiment of a method for managing SAS expanders of the SAS expander storage system 2 using the host computer 1. In the embodiment, the method is performed by execution of computer-readable software program codes or instructions by the at least one processor 12 of the host computer 1. Depending on the embodiment, additional steps may be added, others removed, and the ordering of the steps may be changed.

In step S21, the malfunction detecting module 101 detects a working state of the first SAS expander 21 in real-time. In one embodiment, if each of the hard disk drives 25 is firstly connected to the first SAS expander 21, the working state of the first SAS expander 21 is detected. In other embodiment, if each of the hard disk drives 25 is connected to the second SAS expander 22, so the working state of the second SAS expander 22 is detected.

In step S22, the malfunction detecting module 101 determines whether the first SAS expander 21 fails to function according to the working state of the first SAS expander 21. If the first SAS expander 21 fails to function, step S23 is implemented. Otherwise, if the first SAS expander 21 works properly the process ends.

In step S23, the malfunction detecting module 101 obtains configuration information and a physical address of the second SAS expander 21 from the SAS expander storage system 2, and writes the configuration information and the physical address of the second SAS expander 21 into a firmware configuration file stored in the storage device 11.

In step S24, the device switching module 102 controls the first switch device 20 to switch the RAID card 3 from the first SAS expander 21 to the second SAS expander 22, and establishes a communication connection between the RAID card 3 and the second SAS expander 22.

In step S25, the device switching module 102 controls the second switch device 23 to switch the flash memory 24 from the first SAS expander 21 to the second SAS expander 22, and establishes a communication connection between the flash memory 24 and the second SAS expander 22. In the embodiment, the second switch device 23 switches a clock signal line, a data transfer line, and a logical control line of the flash memory 24 from the first SAS expander 21 to the second SAS expander 22, so that the second SAS expander 22 can communicate with the flash memory 24.

In step S26, the data checking module 103 checks whether data error occurs in any data storage area of the flash memory 24. Referring to FIG. 3, the flash memory 24 includes a plurality of data storage areas, such as the first data storage area, the second data storage area, the third data storage area, and the fourth data storage area. Each of the data storage areas stores basic data of the SAS expander storage system 2. If data error occurs in any data storage area of the flash memory 24, step S27 is implemented. Otherwise, if no data error occurs in any data storage area of the flash memory 24, step S28 is implemented.

In step S27, the data checking module 103 recovers the data error of the data storage area of the flash memory 24 using backup data of a data backup area corresponding to the data storage area of the flash memory 24. Referring to FIG. 3, the flash memory 24 includes a plurality of data backup areas, such as the first data backup area, the second data backup area, the third data backup area, and the fourth data backup area. Each of the data backup areas stores backup data corresponding to the basic data of each of the data storage areas. For example, if the data error occurs in the first data storage area, the data checking module 103 recovers the data error of the first data storage area using the backup data of the first data backup area that corresponds to the first data storage area.

In step S28, the HDD switching module 104 controls the first switch device 20 to disconnect a data link between each of the hard disk drives 25 and the first SAS expander 21, and controls the first switch device 20 to connect each of the hard disk drives 25 to the second SAS expander 22. As such, each of the hard disk drives 25 can communicate with the RAID card 3 through the second SAS expander 22.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A host computer being connected to a serial attached small computer system interface (SAS) expander storage system through a redundant array of independent disks (RAID) card, the SAS expander storage system comprising a first switch device, a first SAS expander, a second SAS expander, a second switch device, a flash memory, and a plurality of hard disk drives, the host computer comprising:
    at least one processor; and
    a storage device storing a computer-readable program including instructions that, which when executed by the at least one processor, causes the at least one processor to:
    detect a working state of the first SAS expander in real-time;
    determine whether the first SAS expander fails to function according to the working state of the first SAS expander;
    write configuration information and a physical address of the second SAS expander into a firmware configuration file stored in the storage device if the first SAS expander fails to function;
    control the first switch device to switch the RAID card from the first SAS expander to the second SAS expander;
    control the second switch device to switch the flash memory from the first SAS expander to the second SAS expander; and
    control the first switch device to disconnect a data link between each of the hard disk drives and the first SAS expander, and control the first switch device to connect each of the hard disk drives to the second SAS expander.

2. The host computer according to claim 1, wherein the computer-readable program further causes the at least one processor to:
    obtain the configuration information and the physical address of the second SAS expander from the SAS expander storage system when the first SAS expander fails to function.

3. The host computer according to claim 1, wherein the computer-readable program further causes the at least one processor to:
    check whether data error occurs in any data storage area of the flash memory; and
    recover the data error of the data storage area of the flash memory using backup data of a data backup area corresponding to the data storage area of the flash memory, if the data error occurs in the data storage area of the flash memory.

4. The host computer according to claim 3, wherein the flash memory comprises a first data storage area, a second data storage area, a third data storage area, a fourth data storage area, a first data backup area, a second data backup area, a third data backup area, and a fourth data backup area.

5. The host computer according to claim 1, wherein the RAID card connects to the first SAS expander and the second SAS expander through the first switch device, and each of the hard disk drives connects to the first SAS expander and the second SAS expander through the first switch device.

6. The host computer according to claim 1, wherein the second switch device switches a clock signal lines, a data transfer line, and a logical control line of the flash memory from the first SAS expander to the second SAS expander.

7. A method for managing serial attached small computer system interface (SAS) expanders using a host computer, the host computer being connected to an SAS expander storage system through a redundant array of independent disks (RAID) card, the SAS expander storage system comprising a first switch device, a first SAS expander, a second SAS expander, a second switch device, a flash memory, and a plurality of hard disk drives, the method comprising:
 detecting a working state of the first SAS expander in real-time;
 determining whether the first SAS expander fails to function according to the working state of the first SAS expander;
 writing configuration information and a physical address of the second SAS expander into a firmware configuration file stored in a storage device of the host computer if the first SAS expander fails to function;
 controlling the first switch device to switch the RAID card from the first SAS expander to the second SAS expander;
 controlling the second switch device to switch the flash memory from the first SAS expander to the second SAS expander; and
 controlling the first switch device to disconnect a data link between each of the hard disk drives and the first SAS expander, and controlling the first switch device to connect each of the hard disk drives to the second SAS expander.

8. The method according to claim 7, further comprising:
 obtaining the configuration information and the physical address of the second SAS expander from the SAS expander storage system when the first SAS expander fails to function.

9. The method according to claim 7, further comprising:
 checking whether data error occurs in any data storage area of the flash memory; and
 recovering the data error of the data storage area of the flash memory using backup data of a data backup area corresponding to the data storage area of the flash memory, if the data error occurs in the data storage area of the flash memory.

10. The method according to claim 9, wherein the flash memory comprises a first data storage area, a second data storage area, a third data storage area, a fourth data storage area, a first data backup area, a second data backup area, a third data backup area, and a fourth data backup area.

11. The method according to claim 7, wherein the RAID card connects to the first SAS expander and the second SAS expander through the first switch device, and each of the hard disk drives connects to the first SAS expander and the second SAS expander through the first switch device.

12. The method according to claim 7, wherein the second switch device switches a clock signal lines, a data transfer line, and a logical control line of the flash memory from the first SAS expander to the second SAS expander.

13. A non-transitory storage medium having stored thereon instructions that, when executed by at least one processor of a host computer, cause the host computer to perform managing serial attached small computer system interface (SAS) expanders, the host computer being connected to an SAS expander storage system through a redundant array of independent disks (RAID) card, the SAS expander storage system comprising a first switch device, a first SAS expander, a second SAS expander, a second switch device, a flash memory, and a plurality of hard disk drives, the method comprising:
 detecting a working state of the first SAS expander in real-time;
 determining whether the first SAS expander fails to function according to the working state of the first SAS expander;
 writing configuration information and a physical address of the second SAS expander into a firmware configuration file stored in a storage device of the host computer if the first SAS expander fails to function;
 controlling the first switch device to switch the RAID card from the first SAS expander to the second SAS expander;
 controlling the second switch device to switch the flash memory from the first SAS expander to the second SAS expander; and
 controlling the first switch device to disconnect a data link between each of the hard disk drives and the first SAS expander, and controlling the first switch device to connect each of the hard disk drives to the second SAS expander.

14. The storage medium according to claim 13, wherein the method further comprises:
 obtaining the configuration information and the physical address of the second SAS expander from the SAS expander storage system when the first SAS expander fails to function.

15. The storage medium according to claim 13, wherein the method further comprises:
 checking whether data error occurs in any data storage area of the flash memory; and
 recovering the data error of the data storage area of the flash memory using backup data of a data backup area corresponding to the data storage area of the flash memory, if the data error occurs in the data storage area of the flash memory.

16. The storage medium according to claim 15, wherein the flash memory comprises a first data storage area, a second data storage area, a third data storage area, a fourth data storage area, a first data backup area, a second data backup area, a third data backup area, and a fourth data backup area.

17. The storage medium according to claim 13, wherein the RAID card connects to the first SAS expander and the second SAS expander through the first switch device, and each of the hard disk drives connects to the first SAS expander and the second SAS expander through the first switch device.

18. The storage medium according to claim 13, wherein the second switch device switches a clock signal lines, a data transfer line, and a logical control line of the flash memory from the first SAS expander to the second SAS expander.

* * * * *